(12) United States Patent
Park

(10) Patent No.: US 6,842,414 B1
(45) Date of Patent: Jan. 11, 2005

(54) APPARATUS AND METHOD FOR COMPENSATING TILT OF OPTICAL DISC

(75) Inventor: Sang On Park, Sungnam (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/573,349

(22) Filed: May 19, 2000

(30) Foreign Application Priority Data

May 19, 1999 (KR) ........................................ 1999/18109

(51) Int. Cl.$^7$ .............................................. G11B 7/09
(52) U.S. Cl. ................................. 369/53.19; 369/44.32
(58) Field of Search .......................... 369/53.19, 44.32

(56) References Cited

U.S. PATENT DOCUMENTS

| | | | | |
|---|---|---|---|---|
| 4,710,908 A | * | 12/1987 | Ohshima et al. | 369/44.11 |
| 5,142,520 A | * | 8/1992 | Yanagi et al. | 369/44.29 |
| 5,502,698 A | * | 3/1996 | Mochizuki | 369/44.32 |
| 5,627,808 A | | 5/1997 | Hajjar et al. | |
| 6,282,161 B1 | * | 8/2001 | Son et al. | 369/53.19 |
| 6,327,234 B1 | * | 12/2001 | Kamiyama et al. | 369/53.23 |
| 6,363,039 B2 | * | 3/2002 | Hayashi et al. | 369/44.32 |
| 6,549,493 B1 | * | 4/2003 | Nakamura et al. | 369/44.32 |
| 6,625,093 B1 | * | 9/2003 | Hong et al. | 369/44.32 |

FOREIGN PATENT DOCUMENTS

| JP | 10-083549 A | 3/1998 |
|---|---|---|
| JP | 10-177729 A | 6/1998 |

* cited by examiner

Primary Examiner—Aristotelis M. Psitos
(74) Attorney, Agent, or Firm—Birch, Stewart, Kolasch & Birch, LLP

(57) ABSTRACT

An apparatus and a method for compensating a tilt of an optical recording medium comprising a servo error generating unit for generating RF(Radio Frequency) signal and a servo error signal from an electric signal outputted from an optical pickup unit, a servo control unit for generating a focus operation signal and a tracking operation signal by signal-processing separately a focus error signal and a tracking error signal outputted from the servo error generating unit, performing a focus search at a certain position in order to detect tilt, and generating a tilt operation signal by detecting tilt, a focus servo operation unit for operating a focus actuator inside of the optical pickup unit by receiving the focus operation signal outputted from the servo control unit, and a tilt operation unit for compensating tilt by controlling the pickup unit in accordance with the tilt operation signal outputted from the servo control unit. The present invention is capable of detecting and compensating a tilt of the optical recording and reproducing medium accurately and quickly, and recording and reproducing accurately on the recording medium.

5 Claims, 3 Drawing Sheets

APPARATUS AND METHOD FOR COMPENSATING TILT OF OPTICAL DISC

BACKGROUND OF THE INVENTION

1. Field of the Invention

The present invention relates to a recording/reproducing apparatus and method of an optical recording medium, and in particular to an apparatus and a method for detecting a tilt of an optical recording medium and compensating a quantity and a direction thereof.

2. Description of the Background Art

Generally, optical recording mediums are classified into a ROM-type (Read Only Memory) medium from which data can be only read, a WORM-type (Write Once, Read Many) medium into which data can be only recorded a single time and from which recorded data can ben read many times, and a rewritable type medium, for example a CD-RW, and a rewritable digital versatile disk (DVD-RW or DVD-RAM), into/from which data/recorded data can be repeatedly recorded/reproduced.

The rewritable optical disk has a land in which information signals can be recorded and a groove in which any information signals can not be recorded, but recently the rewritable optical disk, for example DVD-RAM, can record information signals on the tracks of both the land and groove in order to record more information signals to the disk. Therefore, the wavelength of a laser beam from an optical pickup unit for recording and reproducing the signals to/from the disk must be shorter, and the size of the laser beam must be reduced as numerical aperture of an object lens for collecting light is expanded.

As described above, in the rewritable optical disk, in order to increase the recording density, the distance between the signal tracks must be narrowed. In other words, a signal track pitch is narrowed.

The rewritable high-density optical disk may have a distortion caused during the process of injection and hardening resin. Namely, although a center hole of the disk is pierced into the disk, an eccentricity of the disk may occur. When a disk track is recorded accurately according to a predetermined standard pitch as a spiral value, an eccentricity occurs due to declination of the center hole. Accordingly, the center shaft of a spindle motor does not coincide with the center of the track, although the disk rotates with eccentricity.

Due to the problems above, it is difficult to read out a signal from a target track accurately. CD (Compact Disk) and DVD (Digital Versatile Disk) types have a declination standard and are recorded/reproduced signals onto/from themselves by a tracking servo of the optical recording medium recording/reproducing apparatus against eccentricity to make an optical beam trace a target track any time.

The tracking servo generates al electric signal corresponding to a beam trace state, corrects the position of the beam outputted from the object lens of the optical pickup unit in a radial direction based on the electric signal, and thereby controls the optical pickup unit to trace the track accurately.

Meanwhile, de-track of the beam occurs due to not only the eccentricity of a disk, but also a slant in the disk. The slant may occur due to declination problem of machinery caused in the process of installing the disk at a spindle motor and distortion of the disk. In this case, a focusing signal and a specula surface of the disk do not cross accurately at right angles, but swerves. Likewise, a type of disk slant is tilt.

The tilt is no real problem with CDs having a big tilt margin due to broad track pitch. Herein, the tilt margin means correctable tilt quantity when the disk is declined at a certain degree. But, an application apparatus like an optical disk has a high density, in a DVD having a narrow track pitch, when a slight tilt occurs, in other words, when a disk declines slightly, a beam escapes on an other track, namely, de-track can occur due to a small radial tilt margin for jitters, the tracking servo is not enough to compensate in this case. A beam escapes to a next track by tilt, and does not exist at the center of a track, but the tracking servo may misjudge that the beam had traced a track accurately. At this time, data can not be recorded at a target track and can not be reproduced accurately, thus, double perversion occurs when the recorded data is reproduced.

To solve the above-mentioned tilt problem, there is an exclusive tilt sensor having a light receiving element separately for detecting tilt of a disk. But, its efficiency is low and the size of the set is a problem.

SUMMARY OF THE INVENTION

It is an object of the present invention to provide a recording and reproducing method for an optical recording medium which is capable of performing a focus search at a certain position on an inner and an outer circumferential surfaces of a disk, detecting and controlling tilt.

To achieve the objects, there is provided a method comprising a voltage level or period measuring step which performs focus search and measures voltage levels or periods at an exact focus of each position, a tilt detecting step which detects tilt from the difference of the voltage levels of inner and outer circumferential surfaces or the difference of the periods which are measured at the above step, and a tilt servo performing step which performs a tilt servo operation in tilt reducing direction.

DETAILED DESCRIPTION OF THE PREFERRED EMBODIMENTS

The embodiment of the present invention will be described with reference to the accompanying drawings.

Figure 1:
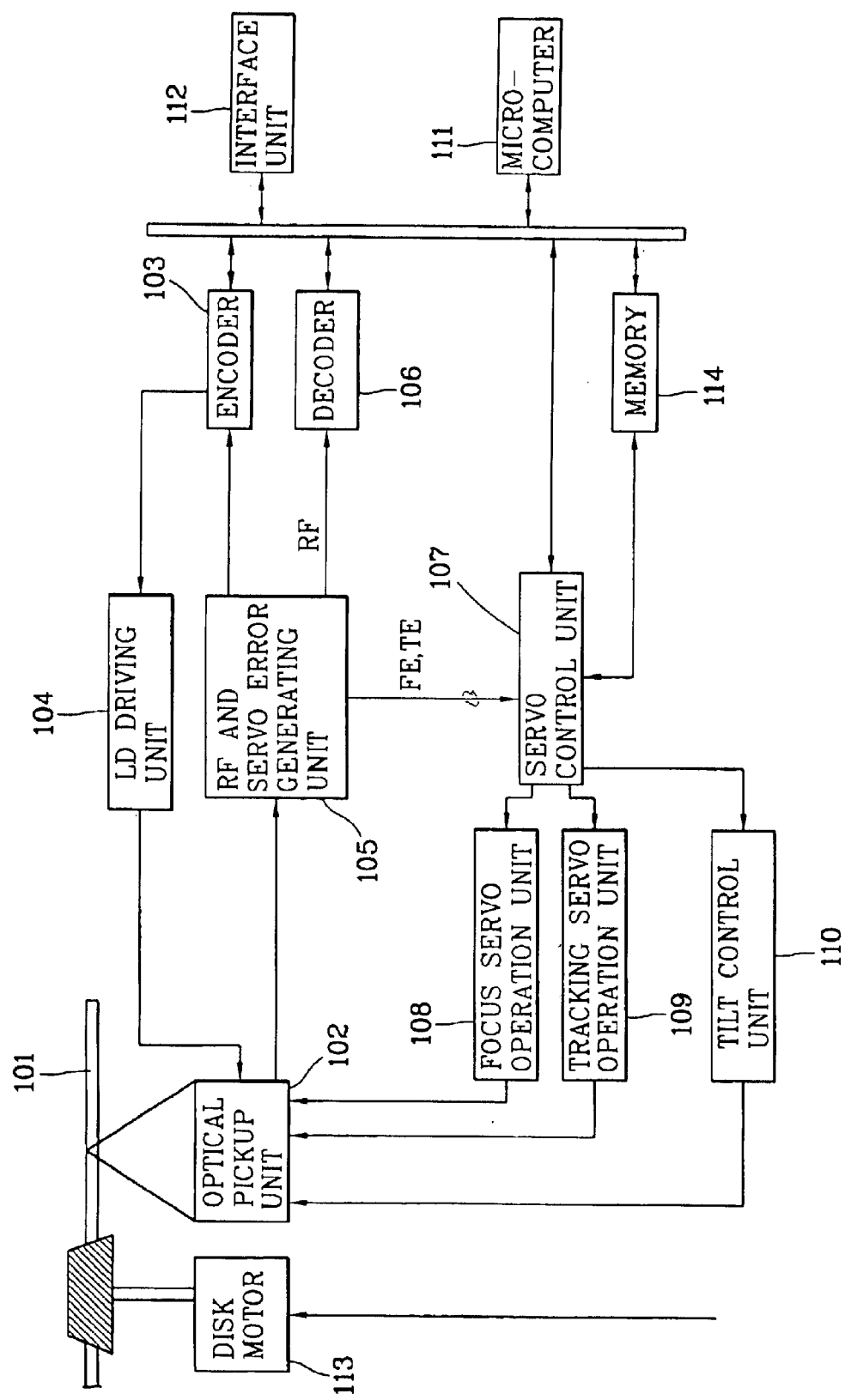
FIG. 1 is a block diagram illustrating a recording and reproducing apparatus for an optical recording medium according to the present invention.

FIG. 1 is a block diagram of an optical disk recording and reproducing apparatus for detecting tilt according to present invention. The apparatus comprises an optical pickup unit 102 for recording and reproducing information onto and from an optical disk 101, a RF (Radio Frequency) and servo error generating unit 105 for generating RF signal and servo error signal from an electric signal outputted from the optical pickup unit 102, when there is data to be recorded on the optical disk 101, an encoder 103 for encoding data into a write pulse format that the optical disk 101 requires in accordance with a control signal of the RF and servo error generating unit 105, a LD (Laser Diode) driving unit 104 for driving the LD inside of the optical pickup unit 102 according to the write pulse format of the encoder 103, a decoder 106 for restoring the data by handling the RF signal detected from the RF and servo error generating unit 105, a servo control unit 107 for signalizing separately a focus error signal(FE) and a tracking error signal(TE) detected from the servo error generating unit 105, generating a focus operation signal and a tracking operation signal, and generating a tilt operation signal by performing a focus research at a certain position for detecting tilt, a focus servo operation unit 108 for operating a focus actuator inside of the optical pickup unit 102 by receiving the focus operation signal which is outputted from the servo control unit 107, a tracking servo operation unit 109 for operating the tracking actuator inside of the optical pickup unit 102 by receiving the tracking operation signal which is outputted from the servo control unit 107, a tilt control unit 110 for compensating a tilt by controlling the optical pickup unit 102 in accordance with the tilt operation signal which is outputted from the servo control unit 107, a microcomputer 111 for controlling the encoder 103, the decoder 106 and the servo control unit 107 according to the recording and reproducing order of a host, and an interface unit 112 for diverting a decoded data into a data packet formation protocol which can be processed on the host, and transmitting the protocol. Here, the tilt control unit 110 has a tilt servo mechanism which compensates a tilt quantity by controlling the optical pickup unit 102 or the disk 101 itself.

The optical disk 101 includes a signal track having a land and groove structure, and which is capable of recording or reproducing data at both land and groove.

Here, the optical pickup unit 102 produces an optical beam which is collected at an object lens set on a signal track of the optical disk 101 by controlling the servo control unit 107, (collects light which is reflected on a signal recording surface at the objective lens again and detects the light at a light receiving element of the light pickup unit 102, and diverts the light into an electric signal which can be transmitted to the RF and the servo error generating unit 105. The optical pickup unit 102 includes a plurality of light detecting elements, and outputs an electric signal to the RF and servo error generating unit 105 in proportion to the light quantities which are received from each light detecting elements.

The RF and servo error generating unit 105 detects RF signal for reproducing data, a focus error signal (FE) for controlling servo, and a tracking error signal (TE) from the electric signal outputted from the light detector inside of the optical pickup unit 102. The RF signal is outputted to the decoder 106 for reproducing, the servo error signal like FE and TE is outputted to the servo control unit 107, a control signal for recording data is outputted to the encoder 103.

The encoder 103 encodes data into a write pulse format which the optical disk 101 requires according to the control signal, and outputs the data to the LD driving unit 104, the LD driving unit 104 records the data on the optical disk 101 by driving the LD of the optical pickup unit 102 with a recording power corresponding to the write pulse.

When the data which is recorded on the optical disk 101 is reproduced, the decoder 106 restores the original data format from the RF signal which is detected at the RF and servo error generating unit 105.

The servo control unit 107 transforms the focus error signal (FE) into an operation signal for focusing controlling, outputs the operation signal to the focus servo operation unit 108, transforms the tracking error signal (TE) into an operation signal for tracking-controlling, and outputs the operation signal to the tracking servo operation unit 109.

The focus servo operation unit 108 moves the optical pickup unit 102 upward and downward by operating the focus actuator inside of the optical pickup unit 102 and follows the optical pickup unit 102 according to its upward and downward movement by rotation of the optical disk 101 operated by a disk motor 113. The focus actuator which operates the object lens upwardly and downwardly for collecting light, namely, in a focus shaft direction, keeps a certain distance from the object lens and the optical disk 101 according to the focus control signal.

The tracking servo operation unit 109 moves the object lens of the optical pickup unit 102 in a radial direction by operating the tracking actuator inside of the optical pickup unit 102, corrects the position of a beam, and performs the track correction. In addition, when a disk is inserted, the servo control unit 107 performs a focus search at a certain position of the inner and the outer circumferential surfaces of the disk for detecting tilt of the disk.

The focus search is to search a position where a focus is fixed exactly by moving the object lens inside of the optical pickup unit upwardly and downwardly, namely, in a focus axis direction, a voltage wave form applied to the focus actuator for the focus search is a focus search wave form.

The optical pickup unit 102 makes the focus actuator set at a certain position by controlling the servo control unit 107, sets a certain time, increases an electric current at a focus actuator coil, thus, the object lens ascends, and a focus search up is performed.

At this point, when a reflecting layer of the disk comes closer to a focus of the object lens, a focus error (FE) having noise is generated.

After that, a laser light is deviation from the reflecting layer by continuing ascending movement of the object lens, a drive current of the focus coil is decreased by controlling of the servo control unit 107, then the object lens is descended and is focused at the reflecting layer, and the light collecting element of the optical detector collects light corresponding to the accurate focus.

A focus error signal based on the collected light quantity at the light detecting element is detected by the RF and servo error generating unit 105.

Meanwhile, the optical recording and reproducing apparatus can be connected to a host such as a PC, the host transmits a recording and reducing signal to the microcomputer 111 through the interface unit 112 of the optical recording and reproducing apparatus, transmits a recording data to the encoder 103, and receives reproduced data from the decoder 106. The microcomputer 111 controls the encoder 103, the decoder 106, and the servo control unit 107 according to the recording and reproducing signal of the host.

The interface unit 112 generally uses ATAPI (Advanced Technology Attached Packet Interface). In more detail, ATAPI is an interface standard between the optical recording and reproducing apparatus for transmitting the decoded data in the optical recording and reproducing apparatus to the host, and transmits the decoded data to a protocol which is designated on the host.

FIG. 2 illustrates an example of a focus search wave form and a focus error signal in focus search which is performed separately at a certain position of the inner and the outer circumferential surfaces of a disk.

An image formed at the light detecting element is changed in accordance with a focus position. A position where the focus error signal is zero, namely, FZC (Focus Zero Cross) position means the accurate focus position. When a focus S-curve occurs, zero crossing, in other words, a position where the focus error signal is sliced as a standard level is the FZC position. A focus zero cross signal means a signal which is detected at the focus zero cross position corresponding to a focus servo on.

Accordingly, the focus zero cross position corresponding to the focus servo on is detected separately at focus search up and focus search down.

But, when there is tilt, a voltage level of the FE signal detected from the inner and the outer circumferential surfaces, namely, a focus search voltage which is detected at the FZC position is chanced. The focus search voltage is also called a DC (Direct Current) level, the DC level is changed according to tilt.

Thus, it is possible to know size and direction of tilt by performing focus search separately at a certain position of the inner and the outer circumferential surfaces and detecting the DC level, and measuring the difference between the two detected DC level. It can be described by equation 1 below.

$$\text{Tilt quantity} = V \text{ inner circumference} - V \text{ outer circumference} \quad (1)$$

Herein, V inner circumference means a focus search wave form which performs focus search at a certain position of the inner circumferential surface and is detected at FZC (Focus Zero Cross) position corresponding to focus servo on, V outer circumference means a focus search wave form voltage which performs a focus search at a certain position of the circumference and is detected at FZC position corresponding to focus servo on.

In equation 1, assuming that α is the result of subtracting the V outer circumference from the V inner circumference, it is possible to know the tilt quantity by a value and know the tilt direction by α sign. Accordingly, when the α sign is −, compensating as α into +direction is possible, when the α sign is +, compensating as α in −direction is possible, accordingly, it is possible to compensate tilt in a tilt reducing direction.

In addition, when a focus search is performed, an accurate focus period is changed at inner and outer circumferential surfaces according to tilt. From FZC signal detecting time in focus search up to FZC signal detecting time in focus search down is a period, the period is changed at inner and outer circumferential surfaces in accordance with tilt quantity.

It is possible to know the quantity and direction of the tilt by performing focus search separately at a certain position of inner and outer circumferential surfaces, detecting both periods, and measuring difference of the two periods. It can be described by equation 2 below.

$$\text{Tilt quantity} = -(T \text{ inner circumference} - T \text{ outer circumference}) \quad (2)$$

Herein, T inner circumference means a period of the FZC signal which performs a focus search at a certain position of the inner circumferential surface and is detected at focus search up and locus search down, V outer circumference means a period of the FZC signal which performs a focus search at a certain position of the circumference and is detected at focus search up and focus search down. The voltage level and the period detected at the FZC position are in inverse proportion.

Thus, assuming that β is the result of −(T inner circumference−T outer circumference), it is possible to know a tilt quantity by β value, and know a tilt direction by β sign. According to this, when the β sign is −, compensating in +direction as the β is possible, when the β sign is +, compensating in −direction as the β is possible. Thus, it is possible to compensate a tilt in the tilt reducing direction.

For this, the servo control unit 107 diverts the size and direction of the tilt which is measured by the method (equation 1 or 2) into a tilt operation signal by signal-processing, and outputs the signal to the tilt control unit 110.

The tilt control unit 110 controls the tilt directly by adjusting the optical pickup unit 102 in +direction or −direction as the tilt quantity in accordance with the tilt operation signal.

Figure 2A:
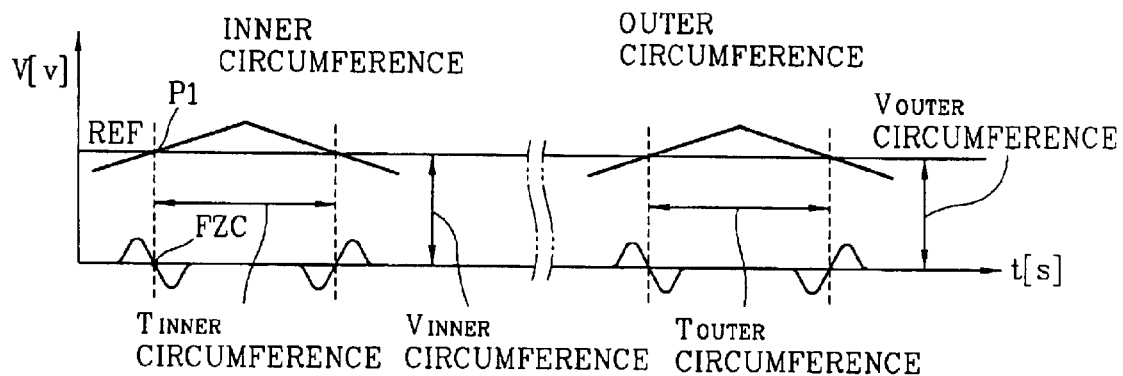
FIGS. 2A through 2C are waveform diagrams illustrating a focus search waveform which is applied during focus search and a focus error signal at this time according to the preferred embodiment of the present invention.
Figure 2B:
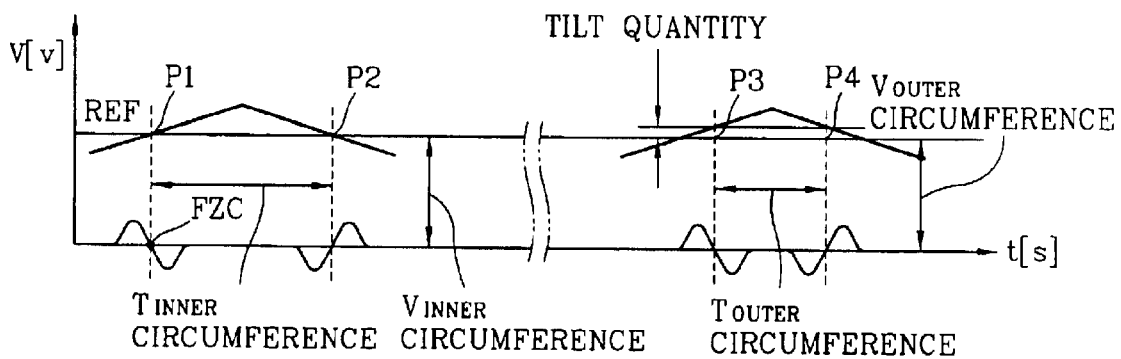

FIGS. 2A and 2B illustrate an example regarding the above-mentioned explanation, FIG. 2A illustrates a case of non-tilt, FIG. 2B illustrates a case having tilt in +X direction. The focus search voltage detected at circumference (V outer circumference) in the FZC position is bigger than the focus search voltage detected at inner circumferential surface(V inner circumference) in the FZC position. On the contrary, the FZC signal detected at T outer circumference is shorter than the period of the FZC signal detected at inner circumferential surface (T inner circumference).

Figure 3:
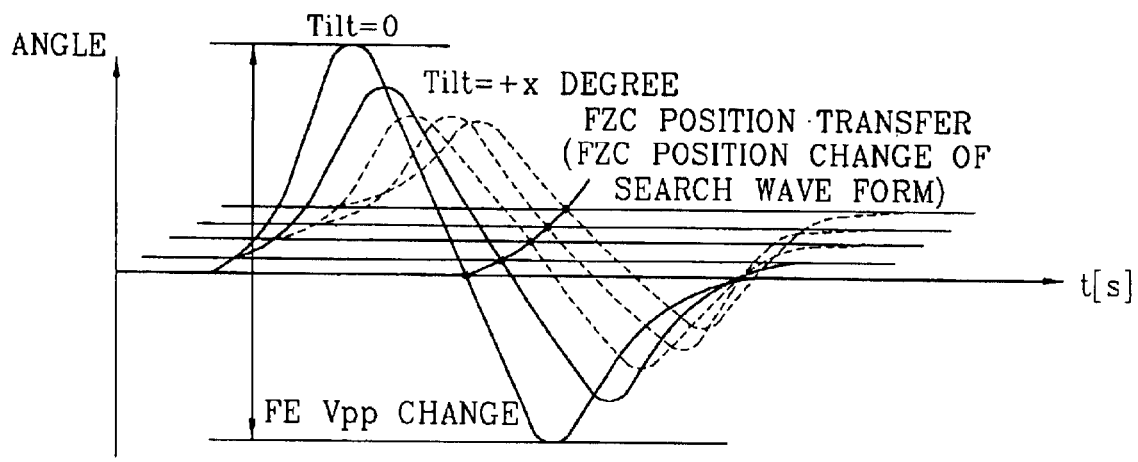
FIG. 3 is a waveform diagram illustrating an example of a FZC (Focus Zero Cross) position transfer when tilt is occurred in +x direction.

FIG. 3 illustrates an example of the FZC position transferring when tilt occurs. Vpp of FE is getting smaller according to tilt quantity.

Figure 2C:
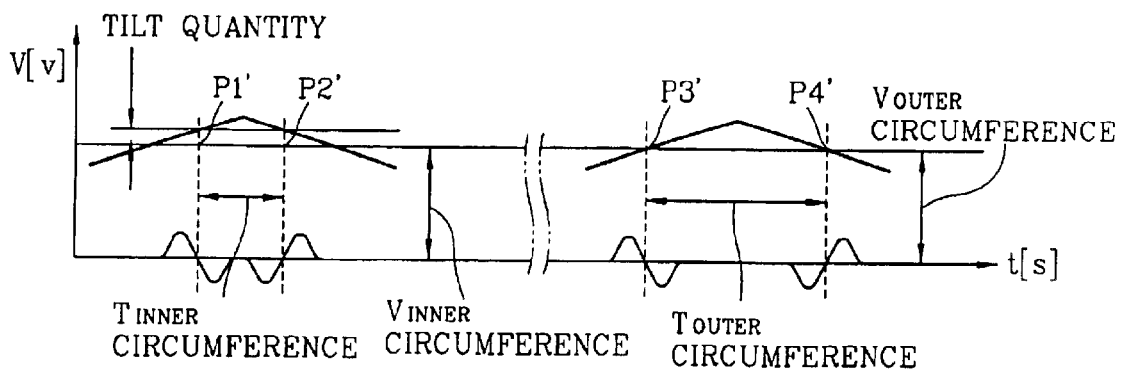

FIG. 2C illustrates an example when a tilt occurs in −x direction, it shows opposite result comparing to FIG. 2B.

When a tilt is detected at a plurality of positions of the disk by using the method, it is possible to make an inclined locus of the disk, and the whole tilt of the disk can be extracted from the locus.

Meanwhile, after storing the quantity and direction of the tilt which is detected each position by the method of the present invention, when the tilt is adjusted in the stored tilt quantity reducing direction at data recording and reproducing, additional tilt detecting time is not required at the positions, therefore, it is possible to stabilize servo quickly, and to record real time.

Figure 4:
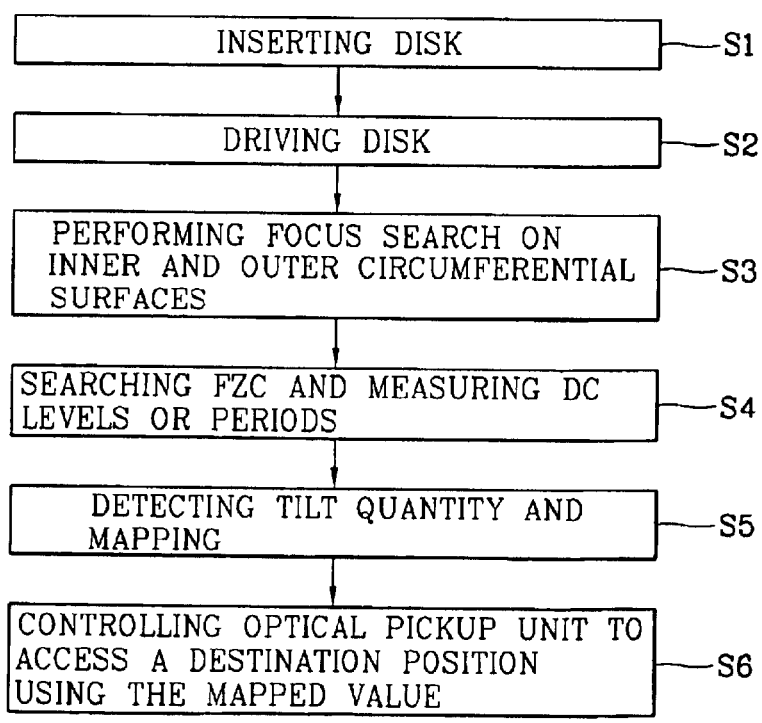
FIG. 4 is a flow chart illustrating a tilt control method for an optical recording medium according to the present invention.

FIG. 4 which is a signal flow chart illustrating a tilt control method of an optical recording medium will now be described in more detail.

First, a disk is inserted at Step S1, and is operated at Step S2 by using the disk motor 103. After this, as depicted in FIG. 2B or FIG. 2C, focus search is performed separately at inner circumferential surface(P1, P2 or P1',P2') and circumference(P3,P4 or P3',P4') of the disk at least once or more than once at Step S3. Voltage DC (Direct Current) levels or periods of inner and outer circumferential surfaces are measured at Step S4 by searching the focus zero cross (FZC). Then, the tilt quantity is detected by the equation 1 or 2 and is mapped on the memory at Step S5. Tilt on an access position is controlled by using the mapped values at Step S6. Thus, tilt values detected at each position of the disk are stored in advance, accordingly, when the optical pickup unit 102 is operated, prompt recording and reproducing of an optical medium is possible.

Likewise, in performing a tilt adjustment or servo, the present invention can detect a tilt between the optical shift and the disk surface, and adjust the tilt by using the methods.

According to the recording and reproducing method for an optical recording medium of the present invention, the method is capable of performing focus search at a certain position of inner and outer circumferential surfaces of a disk, measuring voltage levels or periods at accurate focus of each positions, detecting size and direction of the tilt by difference of the voltage levels or the periods, and compensating the tilt. Accordingly, it is possible to detect and compensate the tilt stably and exactly not using additional light receiving element. Thus, the method can prevent data deterioration and de-track of the disk due to the tilt, and operate the system stably in recording and reproducing.

What is claimed is:

1. An optical disc recording and/or reproducing device capable of determining and compensating for tilting of an optical disc, comprising:

an optical pickup unit having an objective lens for focusing an optical beam reflected on a recording surface of an optical disc, the optical pickup unit also having a focus actuator for varying, in accordance with a focus control signal applied to the focus actuator, a focus position of the optical beam reflected on the recording surface of the optical disc, by moving the objective lens upwardly and downwardly in a focus axis direction to maintain a certain distance between the objective lens and the recording surface of the optical disc, the optical pickup unit further including a light pickup unit having a plurality of light receiving elements for receiving the optical beam reflected on the recording surface of the optical disc and focused by the objective lens and for outputting an electrical signal in proportion to light quantities received by each light receiving element;

a servo error generating unit for detecting the electrical signal outputted by the light pickup unit of the optical pickup unit and for generating a focus error servo (FE) signal in accordance with the detected electrical signal;

a servo control unit for receiving the FE signal generated by the servo error generating unit, generating a focus control operation signal in accordance with the received FE signal, and also generating a tilt operation signal representing a tilt quantity and a tilt direction of the optical disc with respect to the optical pickup unit in accordance with detection of focus zero cross (FZC) occurrences of the FE signal during respective focus search operations performed with the optical pickup unit respectively positioned at at least inner and outer circumferential positions of the recording surface of the optical disc, the FZC occurrences of the FE signal corresponding to accurate focusings of the optical beam on the recording surface of the optical disc during a focus search up operation and a focus search down operation of the optical pickup unit when the optical pickup unit is positioned at at least the inner and outer circumferential positions of the recording surface of the optical disc, wherein the servo control unit determines the quantity of tilt according to a difference in a time period between the focus up search and focus down search FZC occurrences of the FE signal at each position of the recording surface of the optical disc at which a focus search operation is performed, and determines the tilt direction according to whether the thusly determined difference is positive or negative;

a focus servo operation unit for receiving the focus control operation signal from the servo control unit and for generating in accordance therewith the focus control signal applied to the focus actuator of the optical pickup unit; and a tilt control unit having a tilt servo mechanism, for receiving the tilt operation signal generated by the servo control unit and in accordance therewith compensating the tilt of the optical disc with respect to the optical pickup unit, wherein the tilt control unit compensates the tilt of the optical disc with respect to the optical pickup unit by tilting one of the optical pickup unit or the optical disc.

2. The optical disc recording and/or reproducing device according to claim 1, wherein the servo control unit determines the quantity of tilt according to a difference between respective levels of the focus operation control signal at FZC occurrences of the FE signal at each position of the recording surface of the optical disc at which a focus search operation is performed.

3. The optical disc recording and/or reproducing device according to claim 1, wherein the servo control unit determines the quantity and direction of tilt on the basis of focus search operations performed at a plurality of positions of the disc.

4. A method for determining and compensating for tilt of an optical disc in an optical disc recording and/or reproducing device, comprising:

detecting respective focus zero-cross (FZC) occurrences of a focus error servo (FE) signal during each of a focus up search operation and a focus down search operation of an objective lens of an optical pickup when the optical pickup is positioned at at least inner and outer circumferential positions of a recording surface of an optical disc, the FZC occurrences of the FE signal corresponding to accurate focusing of the objective lens on the recording surface;

determining a tilt quantity of the optical disc with respect to the optical pickup according to a difference in level, at FZC occurrences of the FE signal during the respective focus search up and focus search down operations at each respective position of the optical disc at which a focus search operation is performed, of a focus actuator signal driving a focus actuator of the objective lens of the optical pickup;

determining a tilt direction of the optical disc according to whether the thusly determined difference is positive or negative;

compensating for the thusly determined tilt of the optical disc with respect to the optical pickup by tilting one of the optical disc or the optical pickup;

storing in a memory the tilt quantity and direction as thusly determined with respect to each position of the disc at which a focus search operation is performed; and when the disc is recorded and/or reproduced, compensation for the tilt of the disc on the basis of the already stored tilt quantity and direction.

5. The method according to claim 4, wherein focus search operations are performed at a plurality of positions of the disc.

* * * * *